Nov. 5, 1935.                G. A. LYON                2,019,987
                             TIRE COVER
                    Filed June 8, 1931        2 Sheets-Sheet 1

Inventor
George Albert Lyon.
By Charles H. Hills Attys.

Nov. 5, 1935.  G. A. LYON  2,019,987
TIRE COVER
Filed June 8, 1931  2 Sheets-Sheet 2
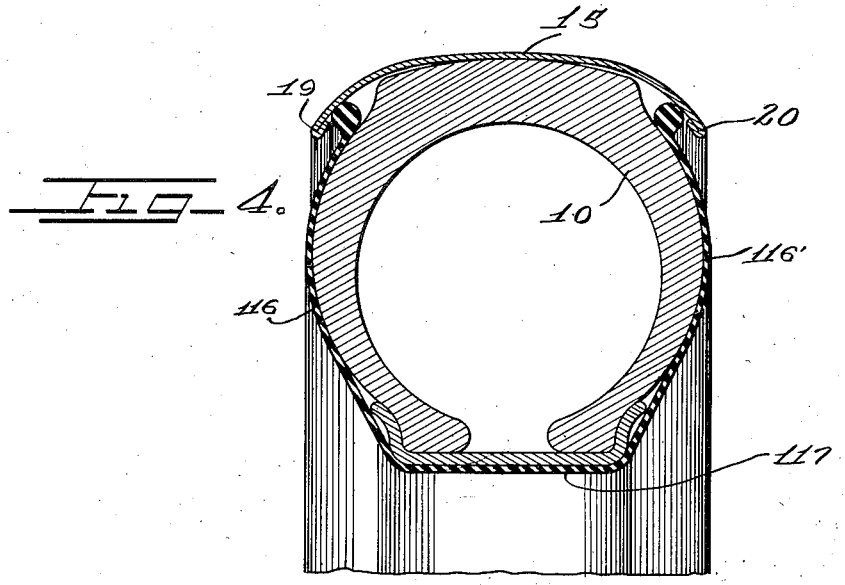
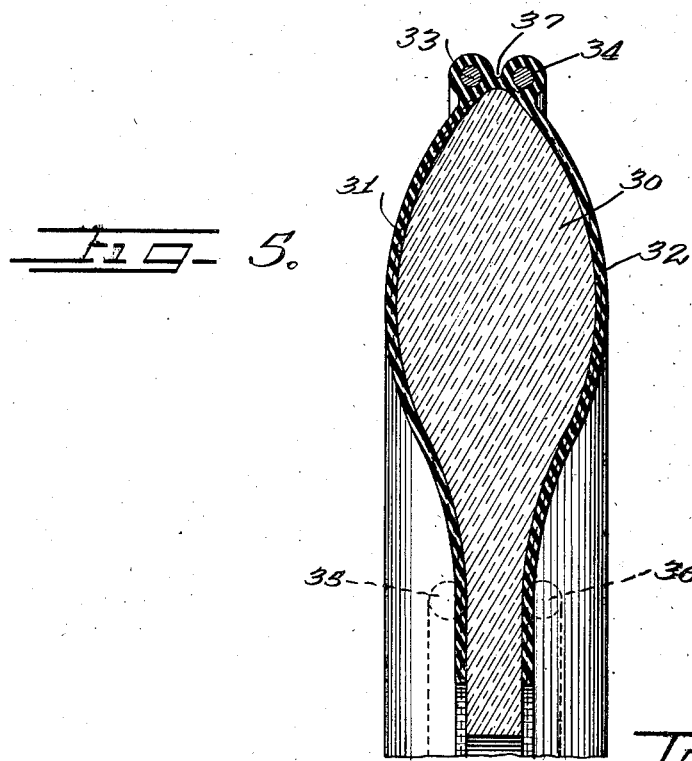
George Albert Lyon.

Patented Nov. 5, 1935

2,019,987

UNITED STATES PATENT OFFICE 2,019,987

TIRE COVER

George Albert Lyon, Allenhurst, N. J., assignor to Lyon Incorporated, Asbury Park, N. J., a corporation of Delaware Application June 8, 1931, Serial No. 542,789

6 Claims. (Cl. 150—54)

This invention relates to tire covers and more particularly to tire covers of the same general type disclosed in my copending patent application Serial No. 315,455, filed October 27th, 1928, and patented Sept. 6, 1932, No. 1,875,316, from which application the subject matter of my present invention has in part been taken. Therefore it will be evident that the present invention is a continuation in part of the invention disclosed in my aforesaid copending patent application.

The object or aim of this invention is to provide a tire cover which is especially adapted for use on a spare tire at the rear of a vehicle and so designed that in the event the outer side part or wall of the cover is struck by a vehicle approaching from the rear of the automobile carrying this cover the likelihood of damage to the cover as a result of such a blow is greatly minimized.

Another object of the invention is to provide a tire cover having a side wall or part made of a relatively pliable material such as rubber as distinguished from metal whereby the possibility of such side wall or part being dented or marred by a glancing blow is substantially obviated.

In accordance with the general features of my invention there is provided a tire cover including a peripheral part or portion for covering the outer periphery or tread of the spare tire and a side wall or part associated with said peripheral part and formed to cover a side wall of the spare tire; this side part being made of a relatively pliable material such as rubber as distinguished from a metallic material.

Another feature of the invention relates to a novel method of manufacturing this side wall or part of the cover which method of manufacture is especially adapted for large scale production of such tire cover parts.

At this time I desire to point out that while I have illustrated my invention as being applied to a multipart cover as distinguished from a unitary construction it is of course to be appreciated that my invention is not to be thus so limited but only as defined by the scope and spirit of the appended claims.

Other objects and features of the invention will more fully appear from the following detailed description taken in connection with the accompanying drawings which illustrate several embodiments thereof and in which Figure 1 is a rear view of an automobile illustrating my spare tire cover as being applied to the spare tire at the rear of the vehicle;

Figure 4 is another sectional view similar to Figure 2 illustrating still a further modification of the invention, and Figure 5 is a fragmentary sectional view taken through a porcelain ring on which a rubber side part for my cover may be fabricated and illustrating the manner in which such parts are fabricated on the ring.

Figure 1:
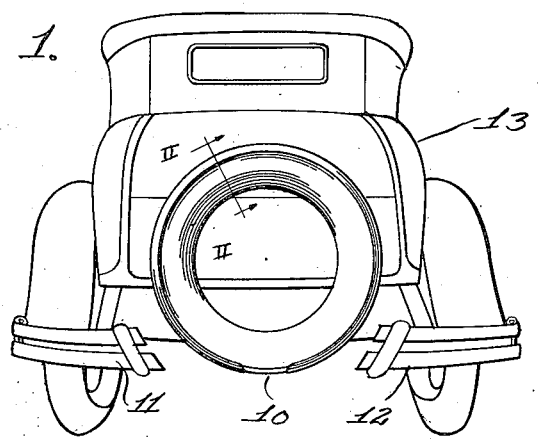
Figure 2:
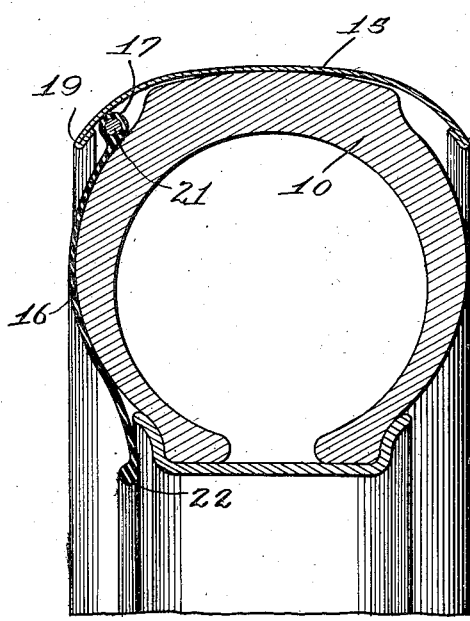
Figure 2 is an enlarged fragmentary cross sectional view taken transversely through the tire and cover shown in Figure 1 and more particularly on the line II—II of Figure 1.

The tire cover of my invention is illustrated in Figure 1 as being applied to a spare tire 10 at the rear of a vehicle in an intermediate position between a pair of bumperettes 11 and 12 on the vehicle 13. This tire cover is of the well known "Lyon" type in that it embodies two parts namely a split circular rim 15 and a circular side part 16 (Figure 2). These two parts are concavo-convex in cross section and are so shaped as to follow the contour of the corresponding portions of the tire over which these parts are adapted to be disposed.

The side part 16 is designed to be positioned over a side wall of the tire as shown in Figure 2 and to be held in place by the split rim part 15 which is inherently resilient so that it may be expanded and contracted onto the tread of the tire to engage the same for the purpose of holding the part 16 in proper position on the tire. That is to say, the resilient split metallic ring 15 has when mounted on the tire an inherent tendency to contract to a diameter less than that of the tire whereby it may embrace the tire to hold the cover thereon. This split rim 15 not only embraces the tire but also embraces a circular bead 17 at the outer margin of the ring-like side part 16 so as to hold said side part in proper tire protecting position. Lateral accidental displacement of the rim 15 from the tire is precluded by the inwardly extending turned marginal portions 19 and 20 thereof.

The ring-like side part 16 which is designed to cover the outer side wall of the tire as shown in Figure 1 is in accordance with the features of this invention preferably made of a relatively pliable or soft material such as rubber as distinguished from a metallic material so as to withstand any glancing blows to which it may be exposed while the cover is in use on the tire at the rear of the vehicle. Also the part 16 may be rigidified by providing its outer rubber bead 17 with an interiorly disposed metal ring 21. Furthermore the use of this metal or wire ring 21 enables the split rim part 15 to better hold the side plate in a substantially rigid position or in other words in proper tire protecting position over the side wall of the tire. The inner periphery of the rubber ring 16 may also be provided with a rubber bead 22 if the same is so desired and such bead 22 will tend to rigidify the inner marginal or peripheral portion of the part 16.

It will now be evident that when the tire cover of my invention is in proper tire protecting position on a spare tire at the rear of a vehicle the rubber side wall or ring 16 will not become dented or marred as readily as it would if it were made of a harder material such for example as metal. This feature will necessarily prolong the life of the tire cover and will result in an enhancing of the appearance of the cover. Further the ring-like side part 16 may be colored in any one of a number of colors as desired and may be provided with a highly polished surface if the same is required.

Figure 3:
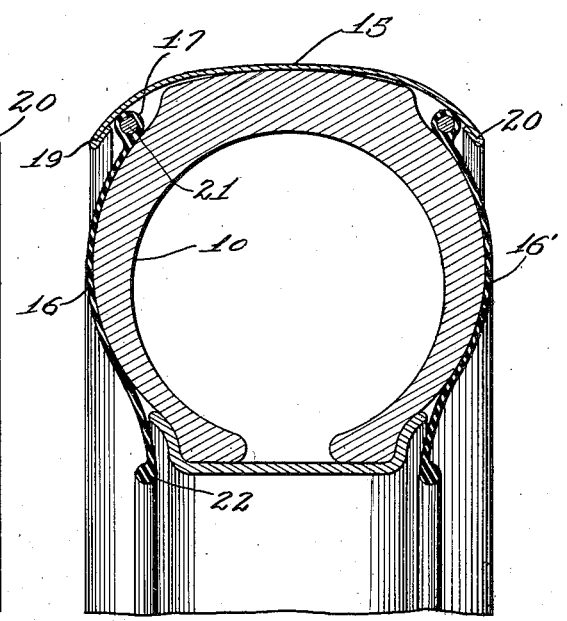
Figure 3 is a sectional view similar to Figure 2 illustrating a modification of the invention.

In Figure 3 I have illustrated a modification of the cover shown in Figure 2 which differs from the Figure 2 form of cover only in that both side walls of the tire 10 are covered by ring-like parts 16 and 16'. Since this cover is substantially identical with that shown in Figure 2 with the exception of the addition of the ring-like part 16' I have used the same reference characters in Figure 3 to designate parts corresponding to those illustrated in Figure 2. The ring-like part 16' is identical to the ring-like part 16 previously described with the exception that it is curved in an opposite direction from that of the part 16 so as to enable it to conform to the contour of the other side wall of the cover.

In Figure 4 there is illustrated still a further modification of the invention in which the metallic split rim 15 is designed to engage the outer peripheral edges of two side wall parts 116 and 116' similar to the parts 16 and 16' in Figure 3 but being connected at their inner peripheral margins by a connecting section of rubber 117.

In the mounting of this form of cover on the tire one side wall part of the cover is collapsed and slid through the opening at the center of the spare tire so that the two parts 116 and 116' may be brought into proper tire protecting position over the side walls of the tire 10. Thereafter the split rim 15 may be snapped or shoved into position on the outer periphery of the tire to frictionally embrace the tire and to also frictionally embrace the outer marginal edges of the two side portions 116 and 116'.

Needless to say the portions 116, 116' and 117 must be made of relatively pliable material such as rubber so that one side portion 116 may be completely collapsed to enable its passage through the center of the spare tire as previously described.

An apparatus for carrying out one way of making the ring-like parts 16 and 16' is illustrated in Figure 4 and comprises a porcelain ring 30 having outer surfaces curved to conform with the curvature desired for the parts 16 and 16'. This ring may be suitably rotated in a soft rubber solution so that a thin layer of rubber is applied on both sides of the porcelain ring as indicated at 31 and 32 as well as on the two wire beads 33 and 34, which are suitably carried on the outermost peripheral edge of the ring 30. The inner peripheral edges of the layers of rubber 31 and 32 may be suitably rolled as indicated at 35 and 36 in dotted lines so as to produce a bead such as the bead 22 shown in Figure 2.

Several dipping operations will necessarily be required to provide the requisite thickness of coating on the porcelain ring 30 and to permit of the drying of one layer before the next layer is applied to make up the coating. Thereafter the two rubber plates on the porcelain ring 30 may be vulcanized in any suitable manner to enhance their strength. Upon the completion of that operation they may be severed at the point indicated at 37 so as to provide two separate ring-like plates such as the plates 16 and 16'. Of course it is understood that the use of porcelain enables the ready removal of the rubber parts therefrom upon the completion of the fabrication of these parts on the porcelain ring 30.

I claim as my invention:

1. In a tire cover, a ring-like plate made of relatively pliable material such as rubber so as to resist denting when in use and formed for disposition over only a side of the tire and having its outer peripheral edge formed to extend inwardly toward and substantially up to the tread of the tire for frictional cooperation with another part of the tire cover.

2. In a tire cover, a ring-like plate made of relatively soft and pliable material so as to resist denting when in use and formed for disposition over only a side of the tire and having its outer peripheral edge formed to extend inwardly toward and adjacent the tread of the tire in co-operation with another part, said plate having rounded peripheral inner and outer annular beads.

3. In a cover for a spare tire or a rim or the like, an annular member having a U-shaped cross-section and defining an annular pocket which opens outwardly and is shaped to receive a spare tire, said member including two outwardly extending sides for disposition over the side walls of the tire, one of which is collapsible to permit the member to be inserted inside of the tire rim whereby both sides may thereafter be positioned over the side walls of the tire.

4. In a cover for a spare tire on a rim or the like, an annular member having a U-shaped cross-section and defining an annular pocket which opens outwardly and is shaped to receive a spare tire, said member including two outwardly extending sides for disposition over the side walls of the tire, one of which is collapsible to permit the member to be inserted inside of the tire rim whereby both sides may thereafter be positioned over the side walls of the tire, and a tread covering band for disposition over the outer periphery of the tire and over the outer margins of the sides of said member.

5. In a cover for a spare tire on a rim or the like, an annular member having a U-shaped cross-section and defining an annular pocket which opens outwardly and is shaped to receive a spare tire, said member including two outwardly extending sides for disposition over the side walls of the tire, one of which is collapsible to permit the member to be inserted inside of the tire rim whereby both sides may thereafter be positioned over the side walls of the tire, and a tread covering band for disposition over the outer periphery of the tire and over the outer margins of the sides of said member, said member being made of a pliable material such as rubber or the like and said band being formed split so as to be expansible and contractible.

6. As an article of manufacture, a spare tire cover including a pair of oppositely disposed tire side wall covering parts made of rubber or the like, each being annular and having a curved convex cross-section so as to conform with the curvature of the corresponding tire side wall, and a tread covering band for disposition over the outer periphery of the tire and for engaging with the outer margins of said side parts at opposite sides of the tire.

GEORGE ALBERT LYON.